No. 705,368. Patented July 22, 1902.
J. R. LOMAS.
KEY RING.
(Application filed Mar. 24, 1902.)

(No Model.)

UNITED STATES PATENT OFFICE.

JOHN R. LOMAS, OF WESTHAVEN, CONNECTICUT.

KEY-RING.

SPECIFICATION forming part of Letters Patent No. 705,368, dated July 22, 1902.

Application filed March 24, 1902. Serial No. 99,760. (No model.)

*To all whom it may concern:*

Be it known that I, JOHN R. LOMAS, of Westhaven, in the county of New Haven and State of Connecticut, have invented a new and useful Improvement in Key-Rings; and I do hereby declare the following, when taken in connection with the accompanying drawings and the letters of reference marked thereon, to be a full, clear, and exact description of the same, and which said drawings constitute part of this specification, and represent, in—

Figure 1:
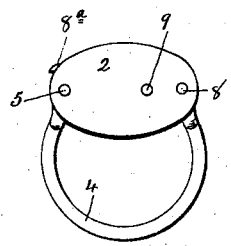
Figure 2:
Figure 3:
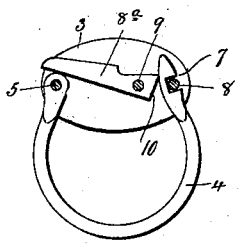
Figure 4:
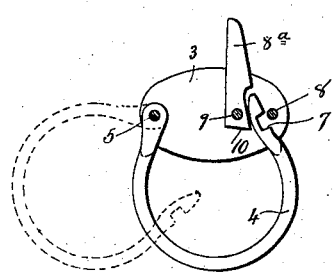
Figure 5:

Figure 1, a view in side elevation of a key-ring constructed in accordance with my invention; Fig. 2, an edge view thereof; Fig. 3, a view in side elevation with one of the plates removed, showing the bail of the ring as closed and locked; Fig. 4, a corresponding view showing the bail in its unlocked position by full lines and in its open position by broken lines; Fig. 5, a detached edge view of one of the modified forms which the sheet-metal housing may assume.

My invention relates to an improvement in key-rings, the object being to produce at a low cost for manufacture a simple, compact, and convenient key-ring constructed with particular reference to its provision with the name of the owner and identifying and advertising or other matter, if desired.

With these ends in view my invention consists in a key-ring having certain details of construction and combinations of parts, as will be hereinafter described, and pointed out in the claims.

In carrying out my invention as herein shown I employ two oval sheet-metal housing-plates 2 and 3, corresponding to each other in size and forming, as it were, a housing for the separated ends of the elastic wire bail constituting the ring proper. One end of the bail is flattened for the reception of a pivot 5, on which it turns and which is passed through the inner ends of the plates 2 and 3 and headed down. The free end of the bail is also flattened and formed in its outer edge with a locking-notch 7, coacting with a locking-pin 8, passed through the outer ends of both of the said plates 2 and 3; or this pin might be replaced by a projection on one of the two plates.

For maintaining the notched free end of the bail 4 in engagement with the locking-pin I employ a lever $8^a$, located between the two plates hung upon a pin 9 and formed with a heel 10, arranged to engage with the inner edge of the free end of the bail. When the lever is turned down into the position in which it is shown in Fig. 3, its heel 10 rides over the inner edge of the notched free end of the bail and forces the same outward, so as to engage the said end of the bail with the locking-pin. On the other hand, when the lever is thrown up into its open position, as shown in Fig. 4, the notched end of the bail springs inward and disengages itself from the pin, after which the bail is free to be swung on its pivot 5 into its open position, in which it is shown by broken lines in Fig. 4. In this position of the bail the keys may be slipped over it or removed from it, as desired.

It will be clear that the outer faces of the plates afford ample opportunity for the application to the ring of the owner's name and address, or for a number, or for any other identifying or advertising matter, all of which may be stamped, engraved, etched, or otherwise applied to the plates. Instead of making the plates independently of each other they might be struck up from a single blank, as shown in Fig. 5, in which the plates 11 and 12, constituting the housing, are formed from a single piece of metal folded, as it were, at the bottom. I would therefore have it understood that I do not limit myself to the exact construction herein shown, but hold myself at liberty to make such departures therefrom as fairly fall within the spirit and scope of my invention.

Having fully described my invention, what I claim as new, and desire to secure by Letters Patent, is—

1. In a key-ring, the combination with a bail, of a sheet-metal housing for the reception of the ends of the bail, one end of which is pivoted to the plates, and a manually-operable lever located within the said housing and coacting with the inner edge of the free end of the bail for forcing the same into its locked position in which it engages with a fixed point within the housing.

2. In a key-ring, the combination with a bail, of two plates together constituting a housing and receiving the ends of the bail one end of which is pivoted to them and the other notched, a lever located within the housing and coacting with the free end of the bail, and a retaining or locking pin mounted in the said plates and engaged by the notched end of the bail when the same is sprung into position for such engagement by the said lever.

3. In a key-ring, the combination with a bail having its ends separated from each other, of a sheet-metal housing exposing two large plane surfaces for the application of advertising or other kindred matter, the said housing being adapted to receive the ends of the bail one end of which is pivoted to it; and a manually-operable lever located within the said housing and coacting with the inner edge of the free end of the bail for forcing the same into its locked position in which it engages with a fixed point within the housing.

In testimony whereof I have signed this specification in the presence of two subscribing witnesses.

JOHN R. LOMAS.

Witnesses:
   GEORGE D. SEYMOUR,
   CLARA L. WEED.